2,934,493
REGENERATING A PLATINUM-ALUMINA REFORMING CATALYST WITH A LOW OXYGEN CONTAINING GAS

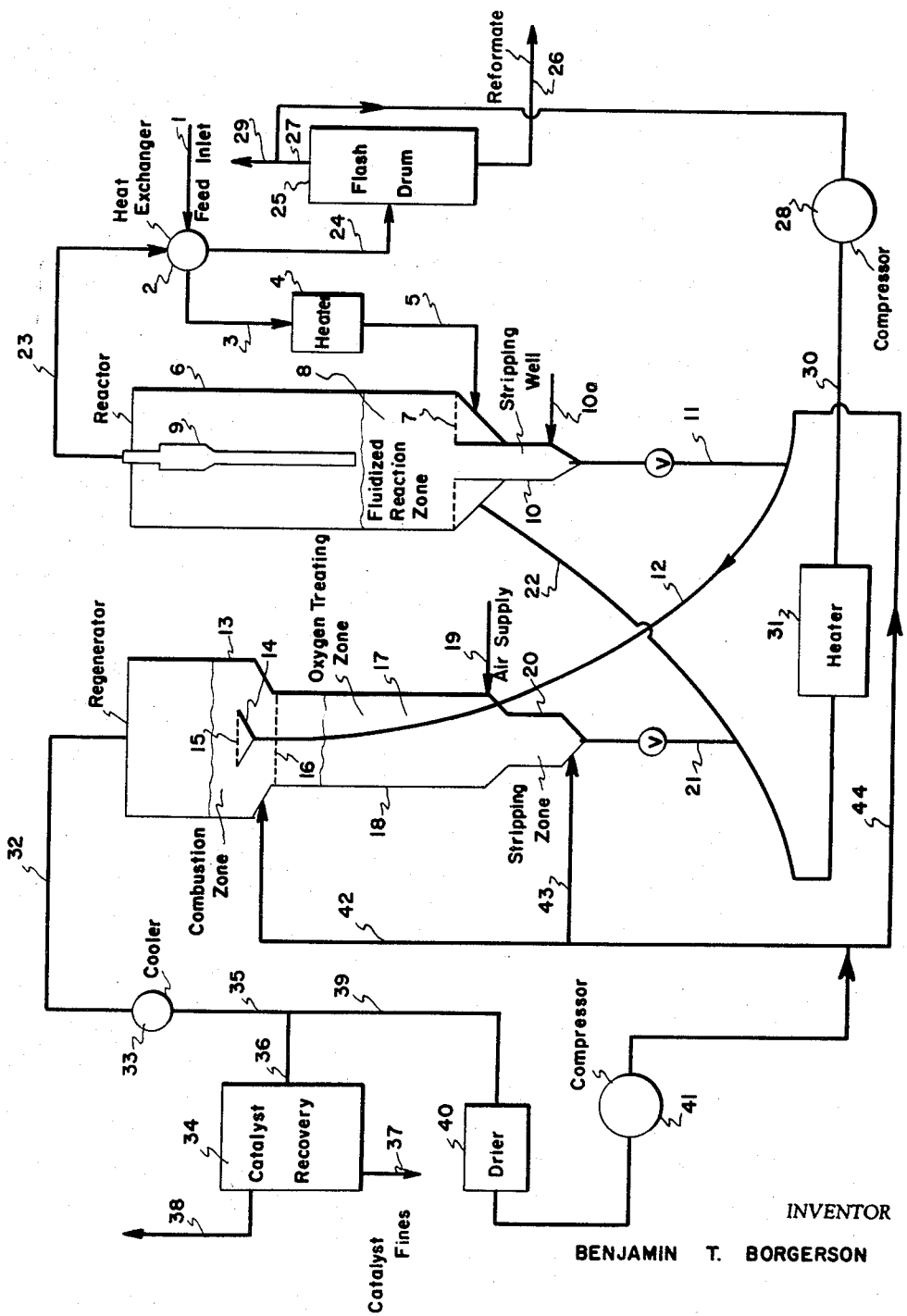

Benjamin T. Borgerson, Homewood, Ill., assignor to Sinclair Refining Company, New York, N.Y., a corporation of Maine Application April 7, 1955, Serial No. 499,799

1 Claim. (Cl. 208—140)

This invention relates to the reforming of petroleum hydrocarbons. More specifically, this invention is concerned with the reforming of petroleum hydrocarbons in the presence of hydrogen with a platinum-alumina catalyst maintained in a fluidized reaction zone with the continuous regeneration of the catalyst.

Recently, considerable efforts have been directed to the reforming of petroleum hydrocarbons in the presence of hydrogen and a fixed bed of platinum-alumina catalyst to provide higher octane and more aromatic stocks. Product requirements are still not so stringent that this fixed bed operation cannot meet these requirements when operated at higher pressures, say about 200 to 500 p.s.i. In the high pressure processing the use of platinum-alumina catalysts may be economically feasible even though they are not regenerable; however, refiners have considered a regenerable platinum-alumina catalyst to be of particular value even in fixed bed units. As an example, the platinum-alumina catalyst of application Serial No. 288,058, filed May 15, 1952, to Teter, Gring and Keith, now abandoned, is a reforming catalyst which is regenerable and which performs especially well under fixed bed conditions.

The application of the fluidized catalyst technique to processes requiring continuous catalyst regeneration has been commercially accepted in the fields of fluid cracking and fluid hydroforming, the latter being with molybdenum-alumina catalyst. As catalytic reforming conditions with platinum-alumina catalyst move in the direction of greater severities because of octane or aromatic demand, the yield advantage for lower pressure operation becomes more pronounced. As pressures are lowered and severities increased, for instance by the use of higher temperature, lower hydrogen-gas recycle ratio, and lower space velocity, the need for continuous regeneration is emphasized. It is in this region of operation that fluidized platinum-alumina reforming is most advantageous over existing processes both in lower initial capital expenditure and in increased net earnings. Although there have been general references to the possibility of reforming with fluidized platinum-alumina catalyst, this operation is inherently engulfed in dangers in the process, particularly in the techniques for handling and treating the catalyst to effect the continuous cyclic reforming and regenerating operations without destroying the superior activity and aging characteristics of the platinum-alumina catalyst.

This invention is concerned with a method of reforming petroleum hydrocarbons in the presence of hydrogen and a fluidized platinum-alumina catalyst of the regenerable type. I have devised a method whereby the petroleum hydrocarbons can be reformed in contact with this fluidized bed while effecting continuous regeneration of the catalyst and maintaining acceptable catalyst activity and aging characteristics. In my method the hydrocarbons are reformed in a reaction zone in which the dense phase fluidized bed of regenerable platinum-alumina catalyst particles is maintained. Coked catalyst particles are withdrawn from the reactor bed and conveyed to the upper part of a downwardly flowing bed of catalyst particles maintained in a combustion zone. In this bed the particles can be mixing in localized areas to avoid high temperatures and to provide a more isothermal type of operation. In the combustion zone substantially dry flue gases recycling from the overhead of this zone and containing a minor amount of oxygen are passed in countercurrent flow to the moving catalyst bed in order to burn carbonaceous material from the particles. The resulting decoked catalyst is then revivified through contact with a dry gas containing a substantially greater amount of oxygen than that present in the gases passing through the catalyst bed in the combustion zone. Oxygen is removed from the revivified catalyst through stripping with a substantially dry oxygen-free gas. The stripped particles are then passed to the fluidized reaction zone utilizing hydrogen-containing gases recycled from the overhead of the reforming reaction which not only serve to convey the catalyst but also are effective in providing at least a substantial part of the reduction of the catalyst necessary before it is active in the reforming reaction.

The invention will be described in further detail with reference to the drawing which is a diagrammatic flow sheet illustrating a system which can be employed to reform petroleum hydrocarbons in accordance with this invention. The flow sheet will be described first in order to orient the processing steps before discussing them in detail and noting their particular advantages.

A suitable petroleum hydrocarbon feed, for instance straight run naphtha, enters the system through line 1 and is heated by passing through heat exchanger 2. The feed then passes by way of line 3 to preheater 4 where it is heated to near reaction temperature. The effluent from the preheater passes by line 5 to the reforming reactor 6. The reactor 6 is an elongated vessel having disposed in its lower portion grid 7 for supporting the fluidized bed of platinum-alumina catalyst 8 in the reaction zone. The overhead from the reforming reaction passes through the cyclone separator 9 with catalyst fines being returned to the fluidized bed by the cyclone dip leg. Opening into the central portion of the grid 7 is catalyst stripping well 10 which provides for the removal of coked catalyst particles from the reaction bed in countercurrent flow to gases entering through line 10a which may consist essentially of hydrogen and low molecular weight hydrocarbons, which gases serve to strip hydrocarbons from the carbonized catalyst.

The preheated effluent from heater 4 passes by way of line 5 into reactor 6 beneath grid 7 and flows into the fluidized catalyst bed to provide the necessary reforming reaction. Coked catalyst is withdrawn from the stripping well 10 by way of line 11 and then conveyed through catalyst riser 12 by the action of substantially dry compressed overhead gases from the combustion zone of the regenerator. The catalyst riser 12 enters the regenerator 13 in its lower portion and then passes upwardly through the central portion of the regenerator and into a downwardly moving catalyst bed maintained in the combustion zone in the upper part of the regenerator. At its upper end the catalyst riser 12 opens into an inverted cone 14 whose base is covered by grid 15. The grid is so located that the catalyst passing upwardly through the cone will pass through the grid and into the upper portion of the catalyst bed in the combustion zone. In the combustion zone the catalyst bed is supported on grid 16, and into the lower portion of the downwardly moving bed is passed at a plurality of points spaced around the regenerator either below or above grid 16 substantially dry flue gases recycled from the regenerator overhead.

In the combustion zone the catalyst is decoked and then passed downwardly through grid 16 onto the upper part of a downwardly moving catalyst bed 17 maintained in an oxygen treating zone 18. Substantially dry air is supplied to the lower portion of zone 18 by line 19. The oxygen treated catalyst from zone 18 then passes downwardly into stripping zone 20 where it is contacted in countercurrent relation by substantially dry oxygen-free flue gases for removal of free oxygen from the catalyst.

Thus the coked catalyst particles are transported to the regenerator through regenerator riser 12 and onto the upper portion of the catalyst bed maintained in the combustion zone. As the bed in the combustion zone is composed of downwardly moving catalyst particles and is in contact with the combustion supporting gases, the particles contain less coke as they move down this bed. The dry inert flue gases which are passed in the lower portion of the combustion zone catalyst bed are joined by oxygen passing upwardly from bed 18 maintained in the oxygen treating zone to form a supporting combustion gas containing a relatively minor proportion of oxygen, e.g. less than about 10 percent by volume. The decoked catalyst particles then pass downwardly through the oxygen treating zone and the stripping zone of the regenerator. As shown in the drawing the cross-section of the combustion zone is larger than the cross-section of the oxygen treating zone which in turn is larger in cross-section than the stripping zone, in order to maintain near equal superficial gas velocities in all zones to permit the downwardly moving flow. Of course, the relative sizes of these beds depend upon the holding time of catalyst desired in the separate beds of the regenerator and the velocity of catalyst through-put maintained.

The regenerated catalyst passes by way of line 21 to the reactor riser 22 and is conveyed to the reforming reactor 6 by hydrogen-containing gases recycled from the overhead from the reforming reactor. As the platinum-alumina catalyst must be reduced before it is effective in the reforming reaction, the hydrogen gases conveying the catalyst to the reaction zone may serve to effect the necessary reduction. Alternatively, a separate treating zone may be provided for this purpose or hydrogen passing to the reforming reactor may afford the desired reduction after the catalyst is in the fluidized bed. The catalyst and hydrogen-containing gases passing in the reactor riser 22 enter the reactor 6 below the grid 7 and then pass upwardly through the grid into the reaction zone 8. The hydrogen-containing gases entering the reactor by reactor riser 22 and the vaporized hydrocarbon feed entering by line 5 serve to maintain the bed in reaction zone 8 in a dense phase, fluidized state.

The overhead from reactor 6 passes through cyclone 9 and line 23 to a heat exchanger 2. In exchanger 2 heat of the overhead is transferred to the fresh feed and the cooled overhead is then passed by way of line 24 to liquid-gas separator 25 to separate the reactor overhead into hydrogen-containing gases and liquid reformate. The reformate is then taken from the system by line 26 and treated or used according to the desires of the operator. The hydrogen-containing gases passing overhead from separator 25 in line 27 pass to compressor 28. Any amount of hydrogen-containing gases not needed for recycling in the system can be withdrawn by line 29. The compressed hydrogen-containing gases pass by line 30 to heater 31 and then to reactor riser 22.

The overhead flue gases from the regenerator 13 are withdrawn by line 32 and pass to cooler 33. A portion of these gases pass to catalyst recovery means 34 by lines 35 and 36. The catalyst recovery means must be extremely effective in separating catalyst fines by way of line 37 due to the high cost of the platinum catalyst. Off-gases are vented from the system by line 38. Another portion of the cooled regenerator gas is passed by lines 35 and 39 to dryer 40 and compressor 41. The dried compressed flue gases are separated into several portions, one portion passing to the lower part of the combustion zone maintained in the regenerator by line 42; another portion passes to the lower portion of the stripping zone 20 of the regenerator by line 43; and a third portion of the compressed flue gases passes by line 44 to regenerator riser 12.

As indicated, it is of the utmost importance to the success of this invention that the catalyst treating and handling procedures be maintained to preserve catalyst activity and aging characteristics. Even though the reaction zone contains the platinum-alumina catalyst in a fluidized bed, the catalyst in the combustion zone of the regenerator moves progressively down the bed. The catalyst from the reactor stripping well thus is carried to the upper part of the bed in the combustion zone. The catalyst moving downwardly in this bed comes in contact with gases which effect the burning of the carbon from the catalyst particles. These gases are comprised predominantly of dry recycle regenerating gases and a minimum proportion of oxygen, e.g. less than about 10 percent by volume, to avoid catalyst sintering by unduly high temperatures and the presence of water vapor. It is essential that this relationship of the flow of the catalyst and the flow of the combustion gases be maintained. Since the catalyst flows downwardly in this bed the particles contain less and less coke as they go down the bed and since the flue gases enter near the grid supporting the bed the decoked catalyst particles are contacted with lesser amounts of water-containing flue gases as the coke deposited on the particles is diminished. This type of contact is essential in this invention since the less coke there is on the catalyst particles the more susceptible are those particles to water sintering. Water sintering effects deactivation of the catalyst which is permanent and which cannot be restored by the regeneration procedure. Thus it is most essential that the catalyst in the bed in the combustion zone pass downwardly with a minimum of back mixing which would effect contact of decoked catalyst particles with water vapor produced by the combustion reaction.

In order to minimize back flow of the catalyst in the combustion zone it may even be desirable to place additional catalyst grids at various levels in the bed. After carbon is removed from the catalyst by burning, it then passes to an oxygen treating or air soaking zone. In this zone the catalyst comes in contact with substantially dry oxygen-containing gases which redistribute the platinum apparently through an oxidation phenomenon. The gases are maintained dry to avoid area and activity losses through water sintering. The oxygen-containing gas most economical is air but in all cases the gas is more concentrated in oxygen than the gases in contact with the catalyst in the combustion zone. In the system of the drawing the catalyst passes downwardly through the bed maintained in the air soaking zone in countercurrent contact with air. Sufficient air is provided in order that the gases passing from the bed in the oxygen treating zone contains sufficient oxygen to provide that necessary to effect the burning in the combustion zone. It may be desirable to provide additional sources of oxygen-containing gas in the combustion zone or riser 12.

The oxygen-treated catalyst from the air soaking zone must be contacted with oxygen-free, substantially dry stripping gases, for instance flue gases, to eliminate free oxygen from the surfaces of the catalyst particles. This oxygen, if allowed to remain on the catalyst particles, has been found to deleteriously affect the reforming system and, in particular, might afford a reaction with hydrogen present in the reforming reaction to form water vapor and thus adversely affect the desirable characteristics of the catalyst.

The stripped catalyst must be reduced before being effective in the reforming reaction. Thus, to afford at least the greatest part of this reduction step the stripped catalyst is conveyed to the reaction zone in hydrogen-containing overhead gases separated from the reforming overhead.

The hydrocarbon feed to the reforming reaction is those stocks which are subject to improvement under the reforming conditions maintained. The preferred stocks are straight run naphthas. The conditions in the reforming reaction can vary widely. The pressure will, in most instances, be below 200 p.s.i. and can vary generally from atmospheric to 200 p.s.i. The lower limit of pressure is governed by its effect on the deactivation of the catalyst and lowering pressure increases both temporary and permanent deactivation; hence, increases regeneration costs and total catalyst costs. The upper limit on the pressure will depend on the allowable yield loss due to increased pressure and the allowable increase in the severity requirement.

The reforming temperature will vary normally from about 750 to 1000° F. To achieve optimum catalyst life temperatures should be as low as possible consistent with the necessary severity required and the optimum yield obtained. The amount of recycle gas passed to the reforming reaction will normally vary from about 2 to 10 moles based on the hydrogen content per mole of naphtha feed. The space velocity is most satisfactory between about 1 to 10 WHSV (weight of feed per weight of catalyst per hour).

As in the reforming reaction, the regeneration operation of the present invention can be conducted under widely varying conditions within the treating and handling limitations noted. For instance, the pressure in the several steps of the overall regeneration operation, i.e., combustion, oxygen treating, and stripping, can vary from about atmospheric to 200 p.s.i. Normally, the regenerator will be so designed that the pressure on the catalyst when considering both the pressure of the vessel and the static head of catalyst will be within a few pounds of the reactor pressure. This is advantageous in order that the cyclic catalyst flow between the regenerator and the reactor be facilitated.

The temperature in the combustion zone of the regenerator will usually be within the range of about 500 to 1000° F. As previously noted, this temperature must not be so high that the catalyst is sintered, and accordingly in the combustion zone the oxygen content of the regenerated gases is maintained below about 10 percent of volume. The optimum regenerator temperature is dependent upon several factors, for instance, low temperatures tend to increase catalyst life, reduce combustion rate and reduce or eliminate heat available for the reaction zone by solids transfer. The holding times necessary in the combustion zone and in the oxygen treating zone of the regeneration system can be varied according to the desires of the operator. The holding time in the combustion zone is dependent upon the amount of coke it is desired to remove from the catalyst and ordinarily this time will not be more than about one hour. The holding time observed in the air soaking zone will be dependent upon the degree of platinum redispersion desired. Normally, the operator would try to obtain maximum platinum redispersion as this is a factor directly proportional to the degree of catalyst activity restored. The holding time in the air soaking zone will be several times that of the combustion zone and may be as long as about thirty hours. The temperature observed in the air soaking zone will usually vary from about 700 to 1000° F. with the upper temperature limit being set by allowable permanent catalyst damage.

In a given system it may be advantageous to transfer cyclically from the reactor to the regenerator heat carrying shot along with the catalyst. This system would allow for minimum circulation of catalyst, thus minimizing attrition while providing a method of transferring heat from the regenerator to the reactor. In considering all of the above-mentioned variables it should be borne in mind that the operator will normally select those conditions which are most favorable to his process and will avoid combinations of these conditions under which his system performs unsatisfactorily. The proper selection of conditions is dependent upon the particular system involved which must be operable and be in heat and material balance while providing the desired reactions both in reforming and regeneration. As an example of operation according to my invention, a 10,000 barrel per day unit feeding on 52° API straight run naphtha operates at a space velocity of 2 WHSV, 4 moles of hydrogen-containing recycle gases from the reaction zone per mole of naphtha feed, a pressure of 50 p.s.i. and a temperature of about 850° F. The fluidizing gases of the reactor have a superificial velocity of 1 foot per second. The reactor has an effective diameter of 19 feet and with a catalyst density of 30 pounds per cubic foot the catalyst bed depth is 6 feet. The catalyst is a fluidized form of a platinum-alumina reforming catalyst prepared according to the procedure of the application of Teter et al., Serial No. 288,058 and having 0.3 percent weight of platinum.

The naphtha feed is preheated to 950° F. before charging to the reactor while the hydrogen gases recycled are at a temperature of 1200° F. The coke make on the catalyst is 1 percent by weight based on the feed and the catalyst is withdrawn from the reactor at the rate of 28,000 pounds per hour and contains about 4.1 weight percent of carbon. In the combustion zone the temperature is 940° F. and the coke burned per hour is 1125 pounds. Flue gas to regenerator overhead is dried and passed to the combustion zone at the rate of 21,000 standard cubic feet per minute and the combustion gases contain 2 percent oxygen provided by gases passing from the air soaking zone. The bed diameter in the combustion zone is 21 feet and the superficial velocity of the combustion gases is 1 foot per second. The catalyst passing to the air soaking zone contains 0.1 weight percent of carbon and in the air soaking zone the temperature is 940° F. Air is supplied to this zone at the rate of 3250 standard cubic feet per minute and the bed is 12 feet in diameter and 17 feet high, while the superficial velocity of the gases is 0.3 foot per second. The catalyst is then contacted with dry oxygen-free flue gases in the stripping zone until free of oxygen and the stripped catalyst is then passed to the reaction zone in the stream of recycled hydrogen-containing gases from the reforming reactor at a temperature of 1200° F.

It is claimed:

The method of reforming petroleum hydrocarbons which comprises contacting under reforming conditions in a reaction zone said hydrocarbons and a dense phase fluidized bed of regenerable platinum-alumina catalyst particles, withdrawing overhead from said reaction zone reformate product including hydrogen-containing gases, withdrawing from said reaction zone coke fouled catalyst particles, stripping the fouled catalyst particles with a substantially dry hydrogen containing gas, passing by means of a substantially dry oxygen-free gas, said particles to the upper part of a downwardly flowing bed of catalyst particles maintained in a combustion zone, passing in counter-current flow to the catalyst bed in the combustion zone gases composed of substantially dry flue gases from said combustion zone and a minor portion less than about 10% by volume of oxygen to burn carbonaceous material from the catalyst, withdrawing substantially decoked catalyst from said combustion zone, passing the decoked catalyst to a separate oxygen treating zone, contacting decoked catalyst with substantially dry revivifying gases containing a substantially greater amount of oxygen than that in the gases passing to the catalyst bed in the combustion zone, removing oxygen from the revivified catalyst by stripping with a substantially dry oxygen-free gas, and then conveying the revivified catalyst to the reaction zone in hydrogen-containing gases separated from the overhead withdrawn from the reaction zone.

References Cited in the file of this patent

UNITED STATES PATENTS

| | | |
|---|---|---|
| 2,406,112 | Schulze | Aug. 20, 1946 |
| 2,643,214 | Hartwig | June 23, 1953 |
| 2,692,848 | Leffer | Oct. 26, 1954 |
| 2,792,337 | Engel | May 14, 1957 |
| 2,856,350 | Love | Oct. 14, 1958 |